United States Patent
Rajchel

(10) Patent No.: US 6,272,575 B1
(45) Date of Patent: Aug. 7, 2001

(54) MODULAR DIGITAL ASSISTANT

(75) Inventor: Suzanne Kennedy Rajchel, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/259,079

(22) Filed: Feb. 26, 1999

(51) Int. Cl.⁷ ..................................................... G06F 13/00
(52) U.S. Cl. ........................ 710/102; 455/11.1; 455/556
(58) Field of Search ................... 710/102, 107, 710/72; 455/11.1, 566, 552

(56) References Cited

U.S. PATENT DOCUMENTS

| | | | |
|---|---|---|---|
| 5,550,861 | * | 8/1996 | Chan et al. ............................ 375/222 |
| 5,600,800 | * | 2/1997 | Kikinis et al. ........................ 710/101 |
| 5,740,232 | * | 4/1998 | Pailles et al. ....................... 379/93.02 |
| 5,742,756 | * | 4/1998 | Dillaway et al. ..................... 713/200 |
| 5,778,256 | * | 7/1998 | Darbee .................................. 710/72 |
| 5,983,073 | * | 11/1999 | Ditzik ................................ 455/11.1 |
| 6,049,453 | * | 4/2000 | Hulsebosch ........................... 361/686 |

OTHER PUBLICATIONS

"HP 48sx Scientific Expandable" Hewlett Packagd, Editiion 4, Jul. 1990.*

* cited by examiner

*Primary Examiner*—Robert Beausoleil
*Assistant Examiner*—X. Chung-Trans
(74) *Attorney, Agent, or Firm*—Nancy R. Gamburd

(57) ABSTRACT

A modular digital assistant includes a base unit and a functionally specific module of a plurality of interchangeable processing or communications modules. Each functionally specific module is removably engageable with the base unit. The combined base unit and functionally specific module provides the functionality of the selected module, such as telephony, gaming, or radio or television broadcast receiving. One member of the plurality can provide telecommunication functions, such as wireline telephony or wireless telephony. Another module of the plurality of functionally specific modules can provide paging functionality. Another module of the plurality can provide card reading functions for carrying out financial transactions or providing entertainment. Yet another module of the plurality could provide video game playing functionality using a game playing input, such as a touch screen display, a trackball, or a joystick.

16 Claims, 3 Drawing Sheets

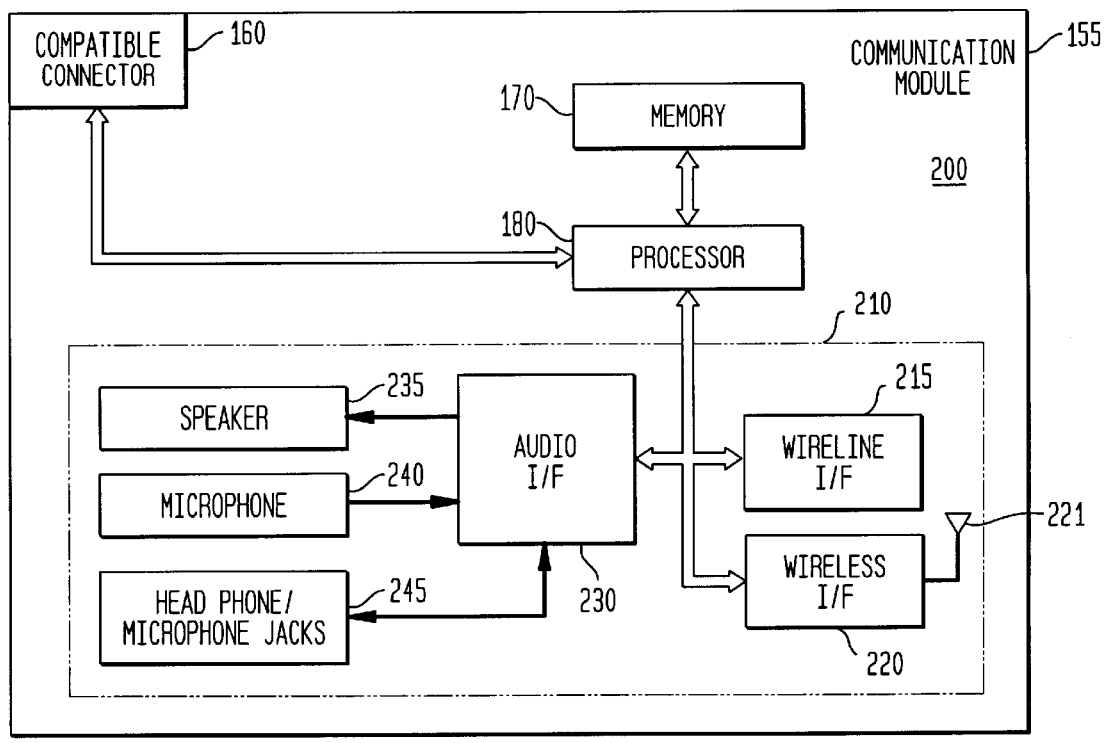
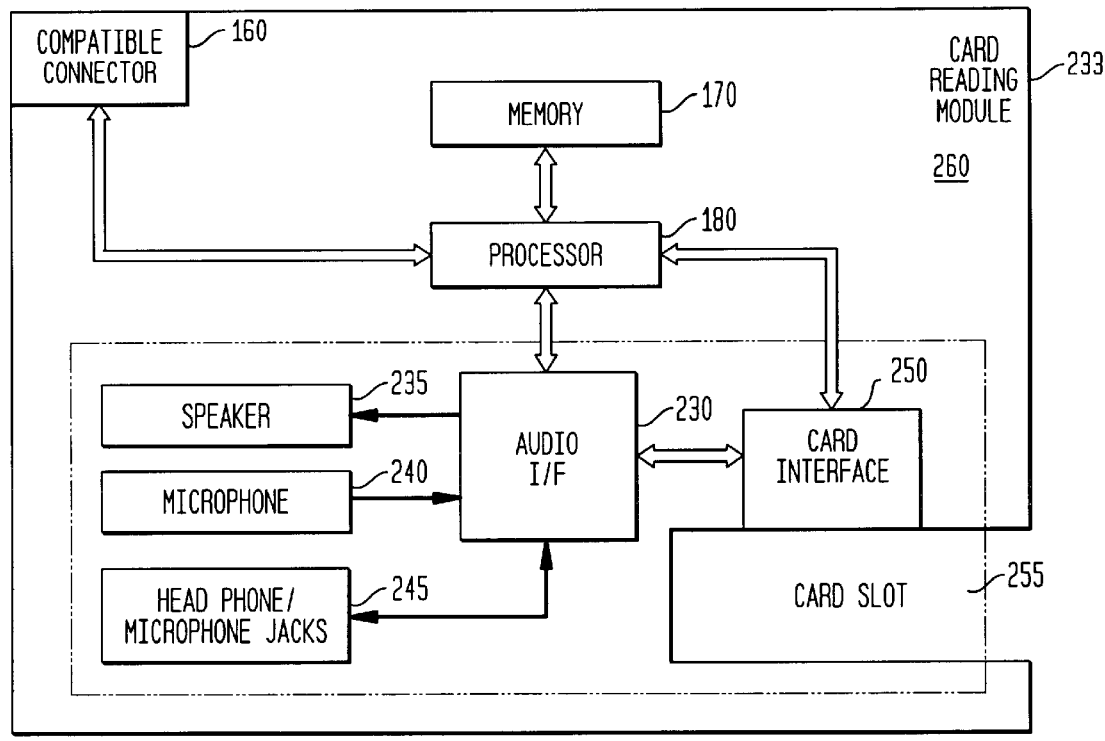

MODULAR DIGITAL ASSISTANT

FIELD OF THE INVENTION

The invention relates in general to portable personal communications devices and digital assistants, and more particularly, to such devices with enhanced functionality achieved by use of a plurality of interchangeable, communications or other functionally specific modules.

BACKGROUND OF THE INVENTION

Hand-held computers or portable digital organizers, sometimes called personal digital assistants, have become cost-effective and useful as sources of information. One example of such a product is the PalmPilot personal digital assistant manufactured by 3Com, which includes various functionalities such as an address book, a date book, a basic calculator, expense reports, and games. This product may also be coupled to a personal computer for information transfer and back-up, and may incorporate a plug-in wireless modem for information transmission.

Many of the same individuals that have a need for portable digital assistants also carry many other devices, such as wireless telephones, cellular telephones, and pagers for communicating with remote sources. Other commonly carried electronic products include dictating and other recording devices, electronic game devices, cassette tape players, compact disk players, DVD players, or other sources of audible or visual programming.

As a consequence, a need remains for a singular device incorporating a plurality of communications and other functions, such that an individual could avail himself or herself of a variety of different communications functions without having to carry a plurality of completely separate products. It would also be desirable to provide such multiple functionality without duplication of hardware such as microprocessors and digital signal processors ("DSPs"). A flexible product preferably also would enable a user to combine communication and other functionally specific modules with a user friendly, common, multi-purpose base unit.

SUMMARY OF THE INVENTION

A modular digital assistant in accordance with the present invention includes a base unit and a plurality of finctionally specific modules. The modules are each removably engageable with the base unit for the purpose of carrying out a particular processing function associated with that module such as, for example, wireline or wireless telecommunications, data transmission, game playing, radio and/or television receiving, and electronic or smart card reading.

The base unit preferably includes control electronics, a user interface (such as an interactive touch screen display, a display unit, keys or a keyboard for entry of information or commands) and a connector for physical and electrical connection to an interchangeable module. Each of the modules incorporates a housing, a compatible connector element carried by the housing (for physical and or electrical connection to the base unit), and control electronics (such as hardware, memory, and software (program instructions) associated with a particular functionality). The control electronics for the base unit and for the modules, variously, could be custom hardware (such as an ASIC or a programmable array), programmable hardware, or both.

Each member of the plurality of modules is intended to provide a different communication or processing function. For example, modules could be provided to carry out wireline or wireless telecommunication.

The telecommunication module could include an internal speaker, microphone, and various filters for communication of audio, both incoming and outgoing. The control electronics of the telecommunication module could carry out number processing of selected directory numbers stored in the base unit, such as on hook, off hook, and DTMF dialing. A list of directory numbers can be displayed on the base unit. A directory number can be selected and then processed by the module to carry out standard dialing, off-hook or on-hook and other telephone-type functions.

The telecommunication module could carry a standard wireline connector as well as a transceiver for wireless communication. The module can also provide internet access and modem-type functions.

Yet another module could incorporate a card receiving slot and a card reader for sensing information prestored on various types of credit, debit or so-called smart cards. In addition to implementing financial or communications functions, based on the information stored on the respective cards, a game processor carried by the module could retrieve and present games stored on a card.

In response to reading information off of the respective cards, the module could cause the base unit to present one or more displays to the user in connection with the on-going function or transaction. A music processor could retrieve digitally encoded music from a respective card and present the music as audio via either a speaker on the module or by means of plug-in head phones. Video could be presented on the base unit's display.

Another module could incorporate or be solely comprised of a standard PCMCIA format card and interface (connector), which may include both additional hardware and software functionality for a given application. Such PCMCIA format modules may include, for example, modem functionality, cellular communication functionality, pager functionality, and/or game functionality.

Yet another module, such as a PCMCIA format module, can provide paging-type communication services. In-coming pages can be received via the module and presented on the base unit's display device. The user in this regard can receive not only telephone numbers but also text messages entered by the paging party or service.

In yet another aspect, a module can receive real time radio frequency (RF) or video signals for presentation as music or voice via a speaker in the module or plug-in head phones. Alternately, real time video can be presented on the base unit's display device.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 2 is a block diagram illustrating a first functionally specific module, usable with the base unit of FIG. 1, for providing communication capability in accordance with the present invention;

FIG. 3 is a block diagram illustrating a second functionally specific module, usable with the base unit of FIG. 1, for reading or responding to information prestored on a card, disk, or similar object;

DETAILED DESCRIPTION OF THE INVENTION

Figure 1:
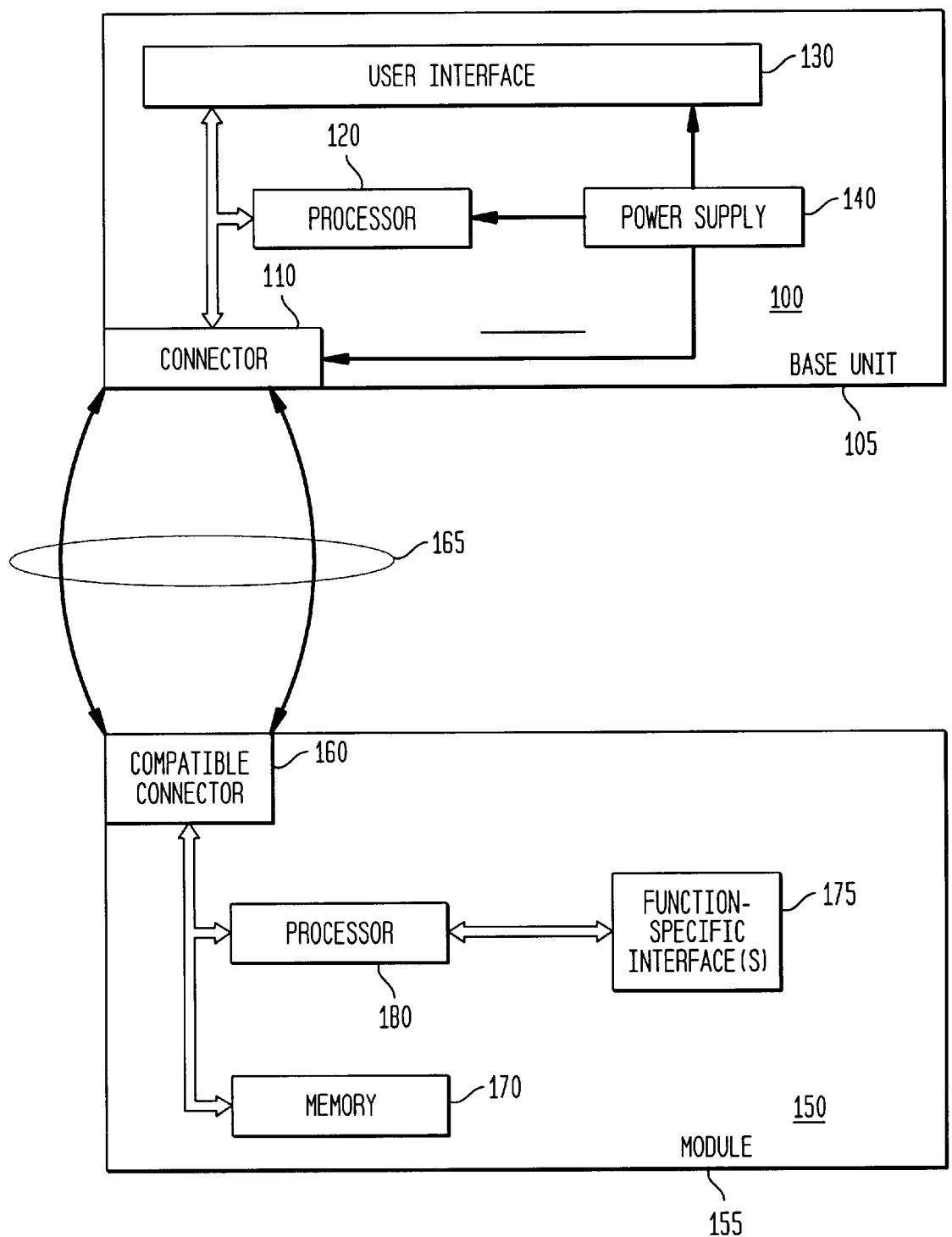
FIG. 1 is a block diagram illustrating generally a base unit and a generic (functionally specific) module in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

As mentioned above, the present invention provides for a singular device incorporating a plurality of communications and other functions, such that an individual could avail himself or herself of a variety of different functions without having to carry a plurality of completely separate products. Such multiple functionality is also provided without duplication of hardware such as microprocessors and DSPs. Also in accordance with the present invention, the modular digital assistant is flexible, enabling a user to combine communication and other functionally specific modules with a user friendly, common, multi-purpose base unit.

FIG. 1 is a block diagram illustrating generally a base unit 100 and a generic functionally specific module 150 in accordance with the present invention. The module 150 is a generic form of a plurality of alternative modules for carrying out various types of processing and communications functions, such as wireline and/or wireless telecommunications (FIG. 2), paging (FIG. 2), game functions (FIG. 4), personal assistant functions, smart or pre-programmed card reading (FIG. 3), and audio-visual programming (FIG. 5). Other types of functionally specific modules 150 can be incorporated into the plurality without departing from the spirit and scope of the present invention.

The base unit 100 includes a housing 105 which carries a connector element 110. Also within the housing 105 are a programmable processor 120, a user interface 130, and a power supply 140. In the preferred embodiment, the user interface 130 is an interactive touch screen display with corresponding input/output display circuitry and drivers. The user interface 130 also can include any type of display device having a two-dimensional display surface suitable for displaying both text and graphics. If desired, an input wand (not illustrated) can be provided for entering information and commands directly through the user interface 130, such as a touch screen. Alternatively for user input, a keyboard and keyboard input circuitry may be included.

A power supply 140 is also carried within the housing 105, supplying electrical power to the processor 120, the user interface 130, the connector 110, and to the module 150 (via the connector 110). The supply 140 is preferably implemented with rechargeable or replaceable batteries.

In the preferred embodiment, the base unit 100 in combination with a functionally specific module 150 is designed to be readily and easily hand-held. As a consequence, the shape and aspect ratio of the housing 105 (as well as of the housing 155 of the functionally specific module 150), the size and weight of the combined base unit 100 and module 150, along with the placement of the user interface, are all intended to be compatible with the user holding the combined base unit 100 and module 150 in one hand when in use.

As mentioned above, a plurality of functionally specific modules 150 are available to be used with the base unit 100. Each of the functionally specific modules 150 includes a compatible connector 160 which is designed to fit or be compatible with the connector 110, such as a standard PCMCIA-format connector, both to provide a secure physical connection between the module 150 and the base unit 100, and to provide a communication connection between the module 150 and the base unit 100, such as an electromagnetic or optical connection for communication and power transfer. A module housing 155 is configured to be compatible with the shape and purpose of the base unit 100 when the base unit 100 and module 150 are removably coupled together by connectors 110 and 160. In addition to a plug-type connection, other types of secure connection may be utilized; for example, the base unit 100 and module 150 can be mechanically latched together, with a latching mechanism indicated generally at 165. When so coupled, the base unit 100 and functionally specific module 150 are still intended to be hand-held and usable while so hand-held.

The functionally specific module 150 also includes a processor 180, a memory 170, and a functionally specific interface 175. The memory 170 stores any information, such as program commands and instructions, specific to the particular functionality of the module 150, such as modem fimctionality or telecommunication functionality. The functionally specific interface 175 includes or contains various components which are also specific to the functionality of the particular module 150, such as radio frequency receivers, cellular frequency transceivers, or telecommunication wireline interfaces. Various exemplary functionally specific interfaces are illustrated below with reference to the specific functional modules of FIGS. 2–5.

Depending upon the various functionalities selected for operation with a base unit 100, various components which may be common among the functionalities may be included within the base unit 100, rather than separately included within each module 150, such as within each functionally specific interface 175. For example, many of the functionalities illustrated below with reference to FIGS. 2–5 commonly include audio input and output capability, such as a speaker, a microphone, or headphone and microphone jacks. In lieu of separately and repetitively providing such elements within each functionally specific module 150, depending upon the desired implementation, one set of those common elements may instead be included within the base unit 100. As a consequence, the selection of those common elements for inclusion within the base unit 100 will vary depending upon the selected or desired applications and functions to be performed by the combined base unit 100 and plurality of finctionally specific modules 150.

Continuing to refer to FIG. 1, the processors 120 and 180 (and the various other processors illustrated below with reference to FIGS. 2–5) may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed in greater detail below, with associated memory, such as microprocessor memory or additional RAM, ROM, EPROM or E²PROM. The various functions of each specific module 150, in accordance with the present invention may be programmed and stored, in the processors 180 and 120, with associated memory and other equivalent components, as a set of program instructions for subsequent execution when the processors 120 and 180 are operative (i.e., powered on and functioning). For example, the processor 120 generally includes instructions for operation of the user interface 130 and for responding to the various functionalities which may be introduced by any one of the plurality of functionally specific modules 150. Correspondingly, any given processor 180 of a functionally specific module 150 generally includes instructions pertinent and specific to the desired functionality of the particular functionally specific module 150, such as specific program instructions for paging, telecommunication, data transmission (modem), games, etc.

FIG. 2 is a block diagram illustrating a communication module 200 (as a type of functionally specific module 150), usable with the base unit 100 of FIG. 1, for providing communication functionality in accordance with the present invention. As illustrated in FIG. 2, the module 200 may provide a wide variety of telecommunication functionality, including audible, full duplex wireline and wireless telephone communications, paging, data transmission and internet access capability (modem input and output). Such functionality is, of course, dependent upon the capacity of the processor 180 and corresponding program instructions; for example, for modem functionality, one or more DSPs and microprocessors may be included within the processor 180, along with instructions pertinent for ITU V.34 or V.90 data transmission capability. The module 200 may also be expanded into several separate and different modules, each with its particular functionality, such as a modem module, a wireline telephone module, a wireless (cellular) telephone module, a paging module, and so on, with a user selecting a given module to suit his or her needs during any given time period.

The communication module 200 includes a processor 180, a memory 170, a connector 160, and a plurality of components comprising a communication functionally specific interface 210. For wireline telecommunication functionality, the processor 180 is coupled to a wireline interface 215 for connection to a standard telephone line. Preferably, the wireline interface 215 includes a RJ-11 type telephone connector (not illustrated), for attaching a telephone line.

For wireless communication functionality, the processor 180 is also coupled to a wireless interface and transceiver 220. The wireless interface and transceiver 220 also includes an antenna 221 carried within the housing 155 or optionally external to the housing 155, such as a flip up antenna or a pull out antenna. The wireless communication functionality is preferably full duplex, such as for cellular telephony (full duplex voice) or paging capability (half duplex messaging, half duplex signaling).

Audio input and output circuitry is also provided, for these various wireline or wireless communication functions. An audio interface 230 containing such circuitry is coupled, for example, to the processor 180 as well as to both the wireline interface 215 and wireless interface and transceiver 220. The audio interface 230 is also coupled to a speaker 235, a microphone 240, and headphone/microphone jacks 245 (for remote audio output and input, respectively), carried by the housing 155.

In operation, when the communication module 200 is coupled to a base unit 100, the user will be able to carry out telecommunication functions, including making calls via directory numbers entered through the user interface 130, and carrying out audio conversations via speaker 235 and microphone 240. Alternately, voice mail stored locally or remotely can be acquired and listened to using the speaker 235. Voice mail may also be captured as or converted to text and stored in the base unit 100 and/or module 200 for subsequent display on the user interface 130.

When appropriately configured, as mentioned above, the communication module 200 may also provide modem functionality for data transmission and reception. Information entered via the user interface 130, for example, can be processed and loaded into memory 170. The stored information, in turn, can be transmitted via wireline interface 215 or wireless interface and transceiver 220. Similarly, information can be downloaded from remote sources and stored in memory 170 for accessing by the user and presentation on a display included within the user interface 130.

Consistent with the above, the communication module 200 can provide support for and access to the internet either over a wireline interface 215 or wireless interface and transceiver 220, also utilizing the user interface 130. Hence, information can be retrieved from one or more web sites and presented for local viewing and interaction by the user.

As mentioned above, the various functionally specific modules, illustrated with reference to FIGS. 2–5, may contain components that are the same as components of the communication module 200. In such instances, the same names and identification numbers are used, with the understanding that various components (such as a processor 180 and memory 170) will have different sets of stored instructions, data and other information specific to the desired functionality of the module. It will be understood that the above discussion also applies to the common components of the functionally specific modules illustrated below.

FIG. 3 is a block diagram illustrating another functionally specific module, a card reading module 260, usable with the base unit of FIG. 1, for reading and/or responding to information prestored on a card, disk, or similar object. Card reading module 260, when coupled to a base unit 100, provides various types of functions either facilitated by or initiated by readable cards of various types including credit cards, debit cards, PCMCIA cards, and so-called "smart" cards. Card reading module 260 includes a housing 233 which carries connector 160. As discussed above, it will be understood that the housing 233 has a shape and arrangement so as to be compatible with the base unit 100.

Card reading module 260 includes a programmable processor 180, which has been or can be programmed to carry out the desired functionality of the card reading module 260. As indicated above, the processor 180 may be identical to other processors 180 of other functionally specific modules, albeit with a different set of instructions.

A card reading interface 250 is coupled to the processor 180. A card slot 255 is provided in the housing 233 to enable a user to insert or slide a card through the slot 255 for purposes of reading relevant information encoded thereon (via card reading interface 250). Card reading module 260 also includes, as discussed above, a memory 170, an audio interface 230, a speaker 235, a microphone 240, and headphone/microphone jacks 245.

When coupled to the base unit 100, card reading module 260 enables a user to insert a card in or slide a card through card slot 255, receive information therefrom, and carry out processing or communications functions initiated by the user interface 130. For example and without limitation, card reading module 260 could be used to read games or music stored on the respective card. Hence, a user could enter a game, by means of inserting or sliding the respective card through the slot 54b, into memory 170.

Processor 180, in conjunction with processor 120 of base unit 100, could execute the instructions for the stored game. Audible messages can be generated using such processors 180 and 120 (preferably having DSP functionality), for presentation to the user via audio input/output interface 230 and speaker 235. Similarly, graphical displays can be presented to a display of the user interface 130, enabling a user to interact therewith via the selected means of user input of the base unit 100, such as a touch screen, a keyboard, a stylus, a game stick, a track ball, or a microphone.

Figure 4:
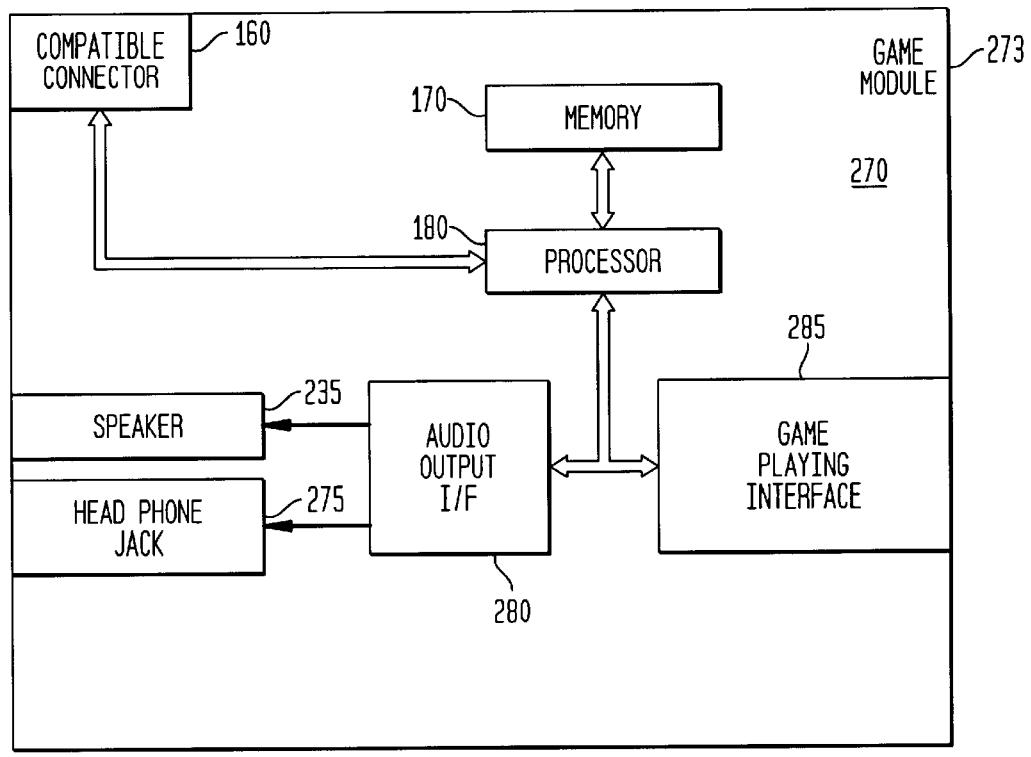
FIG. 4 is a block diagram illustrating a third functionally specific module, usable with the base unit of FIG. 1, for presenting a video game to a user.
Figure 5:
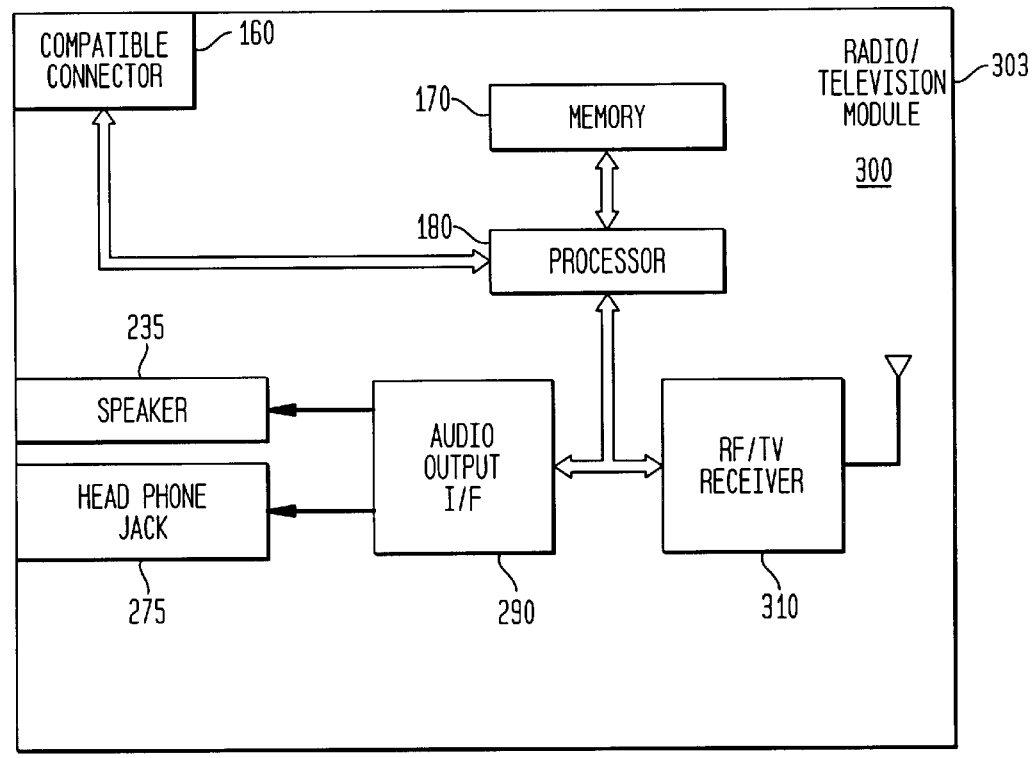
FIG. 5 is a block diagram illustrating a fourth functionally specific module, usable with the base unit of FIG. 1, for providing radio and television-type broadcast information to a user.

FIG. 4 is a block diagram illustrating another functionally specific module, a game module 270, usable with the base unit of FIG. 1, for presenting a video game to a user. Game module 270, when combined with a base unit 100, enables a user to execute a selected video game. Game module 270 has a housing 273 of a shape and size compatible with the shape and size of the base unit 100. Game module 270 includes a processor 180, which is in turn coupled to a game playing interface 285, which may include means of user input, such as a track ball, a joystick, an arrow key set, other keys, or the like.

For the game module 270, processor 180 would be programmed with a set of game playing instructions. These instructions, based on one or more video games stored in memory 170, would enable a user to play a selected game using the user interface 130 and the game playing interface 285. Audible outputs could be generated via processors 180 and 120, audio output interface circuitry 290 (with speaker 235 and/or headphone jack 275.

FIG. 5 is a block diagram illustrating another functionally specific module, a radio and television module 300, usable with the base unit of FIG. 1, for providing radio and television-type broadcast information to a user. Radio and television module 300, in combination with a base unit 100, implements a radio or a television broadcast receiving function. Radio and television module 300 includes a processor 180 which includes a set of preprogrammed instructions specific to radio and/or television broadcast reception.

The processor 180, in addition to being coupled to connector 160 and memory 170, is also coupled to radio/television receiver 310 (which also includes an antenna within the housing 303.

Audible output from the receiver 310 is coupled through an audio output circuitry interface 290 and can be presented to a user via speaker 235 or headphone jack 275. Video output can be coupled from the receiver 310 via connector 160 and processors 180 and 120 to a display of the user interface 130 of the base unit 100. The receiver 310 can be tuned by the user via user interface 130.

It will be understood that any of the above-described functionally specific modules could be provided with additional or enhanced processing functions without departing from the spirit and scope of the present invention. For example, card reading module 260 could also be provided with a game playing interface, such as interface 285, to provide an enhanced game playing experience. Additionally, card reading module 260 could also be provided with a telephone-type wireline or wireless interface (of FIG. 2) for purposes of carrying out financial transactions with a remote entity or the like, such as a bank or brokerage house.

Numerous advantages of the present invention may be readily apparent from the above discussion. First, the present invention provides for a singular device incorporating a plurality of different communications and other functions. Utilizing the present invention, an individual could avail himself or herself of a variety of different functions without having to carry a plurality of completely separate products. Second, such multiple functionality is also provided without duplication of hardware such as microprocessors and DSPs. Also in accordance with the present invention, the modular digital assistant is also flexible, enabling a user to combine communication and other functionally specific modules with a user friendly, common, multi-purpose base unit.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A multi-purpose, portable modular digital apparatus comprising:

a base unit, the base unit having a housing of a size adapted to fit into a user's hand; the base unit further including a user interface, a first connector, and a first processor coupled to the user interface and to the first connector, the first processor including instructions solely for driving the user interface;

at least one functionally specific module selected from a plurality of functionally specific modules wherein each functionally specific module of the plurality provides a different interactive function to form a plurality of interactive functions, the functionally specific module removably couplable to the base unit and functionally interactive therewith; wherein the functionally specific module is adapted to provide, when coupled to the base unit, a selected, interactive function of the plurality of interactive functions; and wherein the base unit and the functionally specific module when coupled together form a hand-held, integrated unit with the functionally specific module carried substantially fixed on the housing; wherein the first processor drives the user interface in accordance with the selected interactive function provided by the functionally specific module;

wherein the functionally specific module is selected from a plurality of functionally specific modules which provide interactive functions from a class including:

a paging function;
an internet access function;
a data transmission and reception function;
a wireline telecommunication function;
a wireless telecommunication function;
a television broadcast reception function;
a radio broadcast reception function;
an audible entertaining function;
an audible and visual entertaining function;
an interactive gaming function;
a disk reading function; and
a card reading function;

wherein the functionally specific module further includes a second processor, the second processor including instructions specific to the function selected from the class;

wherein input and output functionality for the functionally specific module is provided by the user interface of the base unit; and wherein the selected, interactive function of the functionally specific module is user controlled via the user interface.

2. The digital apparatus of claim 1 wherein the first processor includes instructions for establishing images on a display of the user interface in accordance with the interactive function selected from the class.

3. The digital apparatus of claim 2, wherein the functionally specific module includes a slot for receiving an encoded card when the functionally specific module provides a card reading function.

4. The digital apparatus of claim 1, wherein the plurality of functionally specific modules have a PCMCIA compatible form.

5. The digital apparatus of claim 1, wherein the functionally specific module includes an audio output interface, a speaker coupled to the audio output interface, and a headphone jack coupled to the audio output interface, wherein the functionally specific module provides an audio function.

6. The digital apparatus of claim 1, wherein the functionally specific module further includes a second connector compatible with the first connector for removable coupling of the functionally specific module with the base unit and for communication between the functionally specific module and the base unit.

7. The digital apparatus of claim 1, wherein the user interface is an interactive touch screen.

8. A multi-purpose, portable modular digital apparatus personalizable to a predetermined interactive function, the digital apparatus comprising:

a plurality of different function imparting modules for providing a corresponding plurality of selected predetermined interactive functions, the plurality of predetermined interactive functions including at least one interactive function selected from a set of interactive functions including wireline telecommunication, wireless telecommunication, data transmission and reception, internet access, television broadcast reception, radio broadcast reception, card reading, disk reading, paging, gaming, audio programming, and video programming;

wherein the function imparting module further includes a first processor, the first processor including instructions specific to the interactive function selected from the set of interactive functions;

a receiving base unit holdable in a user's hand, engageable one at a time with each of the function imparting modules, wherein the receiving base unit includes a housing having a connector for removably engaging a selected one of the function imparting modules, the receiving base unit further including a second processor coupled to the connector and a user interface coupled to the second processor, the user interface including a visual, two dimensional display, the second processor including instructions solely for driving the user interface in accordance with the selected interactive function provided by the selected function imparting module; and wherein the selected interactive function of the selected function imparting module is user controlled via the user interface; and wherein input and output functionality for the functional imparting module is provided by the user interface of the receiving base unit.

9. The digital apparatus of claim 8 wherein the second processor includes a set of instructions executable thereby for providing text on the display of the user interface in accordance with the selected function imparting module.

10. The digital apparatus of claim 8 wherein the second processor includes a set of instructions executable thereby for providing a graphical image on the display of the user interface in accordance with the selected function imparting module.

11. The digital apparatus of claim 8, wherein the plurality of function imparting modules have a PCMCIA compatible form.

12. The digital apparatus of claim 8, wherein the function imparting module includes an audio output interface, a speaker coupled to the audio output interface, and a headphone jack coupled to the audio output interface, wherein the function imparting module provides an audio function.

13. A digital apparatus of claim 8 wherein the second processor includes a set of instructions executable thereby for providing a voice communication function of the user interface in accordance with a selected function imparting module.

14. A multi-purpose, portable modular digital apparatus comprising:

a base unit, the base unit having a housing of a size adapted to fit into a user's hand; the base unit further including a user interface, a first connector, and a first processor coupled to the user interface and to the first connector, the first processor including instructions solely for driving the user interface; and at least one functionally specific module selected from a plurality of functionally specific modules, wherein each functionally specific module of the plurality provides a different interactive function selected from a plurality of interactive functions including a paging function, an internet access function, a data transmission and reception function, a wireline telecommunication function, a wireless telecommunication function, a television broadcast reception function, a radio broadcast reception function, an audible entertaining function, an audible and visual entertaining function, an interactive gaming function, a disk reading function and a card reading function; the functionally specific module removably couplable to the base unit and functionally interactive therewith; wherein the functionally specific module further includes a second processor, the second processor including instructions specific to the selected interactive function of the plurality of interactive functions: wherein the functionally specific module is adapted to provide, when coupled to the base unit, the selected interactive function of the plurality of interactive functions; and wherein the base unit and the functionally specific module when coupled together form a hand-held, integrated unit with the functionally specific module carried substantially fixed on the housing, wherein the first processor drives the user interface in accordance with the selected interactive function provided by the functionally specific module; and wherein input and output functionality for the functionally specific module is provided by the user interface of the base unit, and wherein the selected, interactive function of the functionally specific module is user controlled via the user interface.

15. The digital apparatus of claim 14, wherein the plurality of functionally specific modules have a PCMCIA compatible form.

16. The digital apparatus of claim 14, wherein the functionally specific module includes an audio output interface, a speaker coupled to the audio output interface, and a headphone jack coupled to the audio output interface, wherein the functionally specific module provides an audio function.

* * * * *